Sept. 17, 1957    A. J. THOMPSON    2,806,466
HUMIDIFYING SYSTEM
Filed April 16, 1954    2 Sheets-Sheet 1
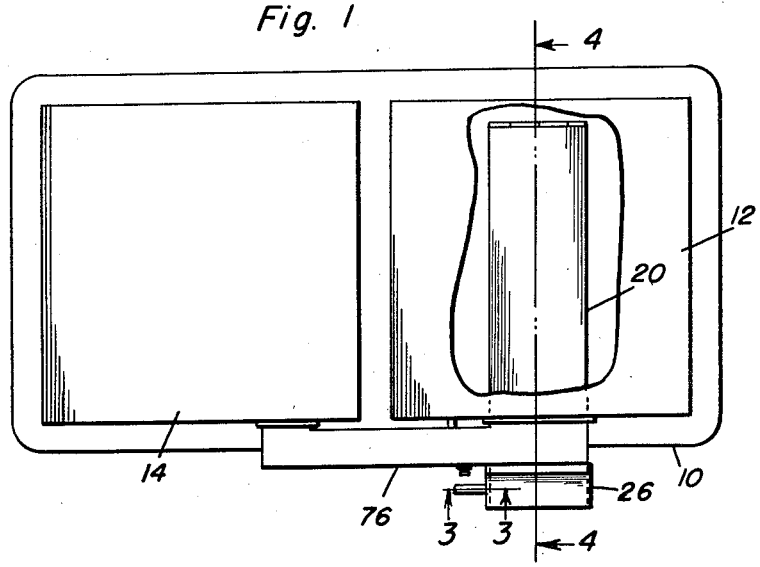
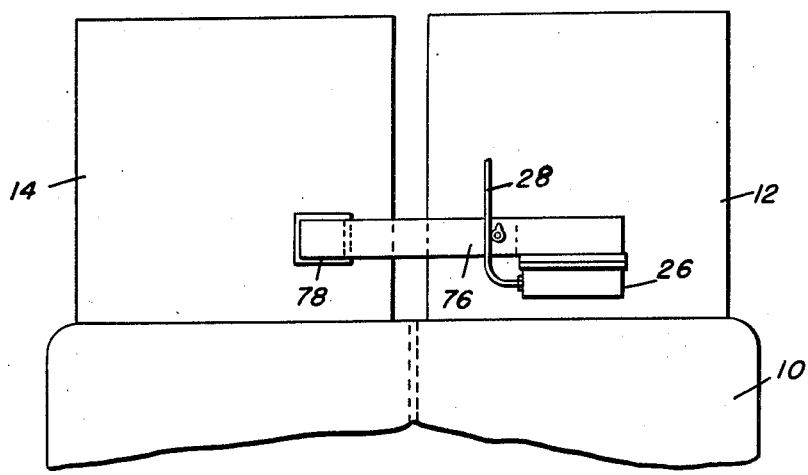
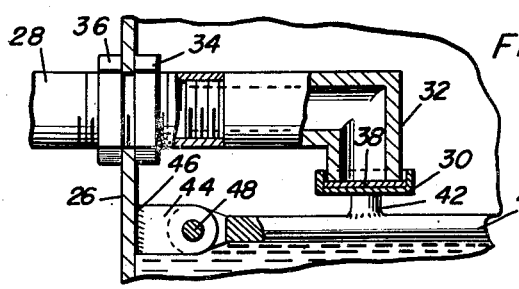
Albion J. Thompson
INVENTOR.

Sept 17, 1957 A. J. THOMPSON 2,806,466
HUMIDIFYING SYSTEM
Filed April 16, 1954 2 Sheets-Sheet 2
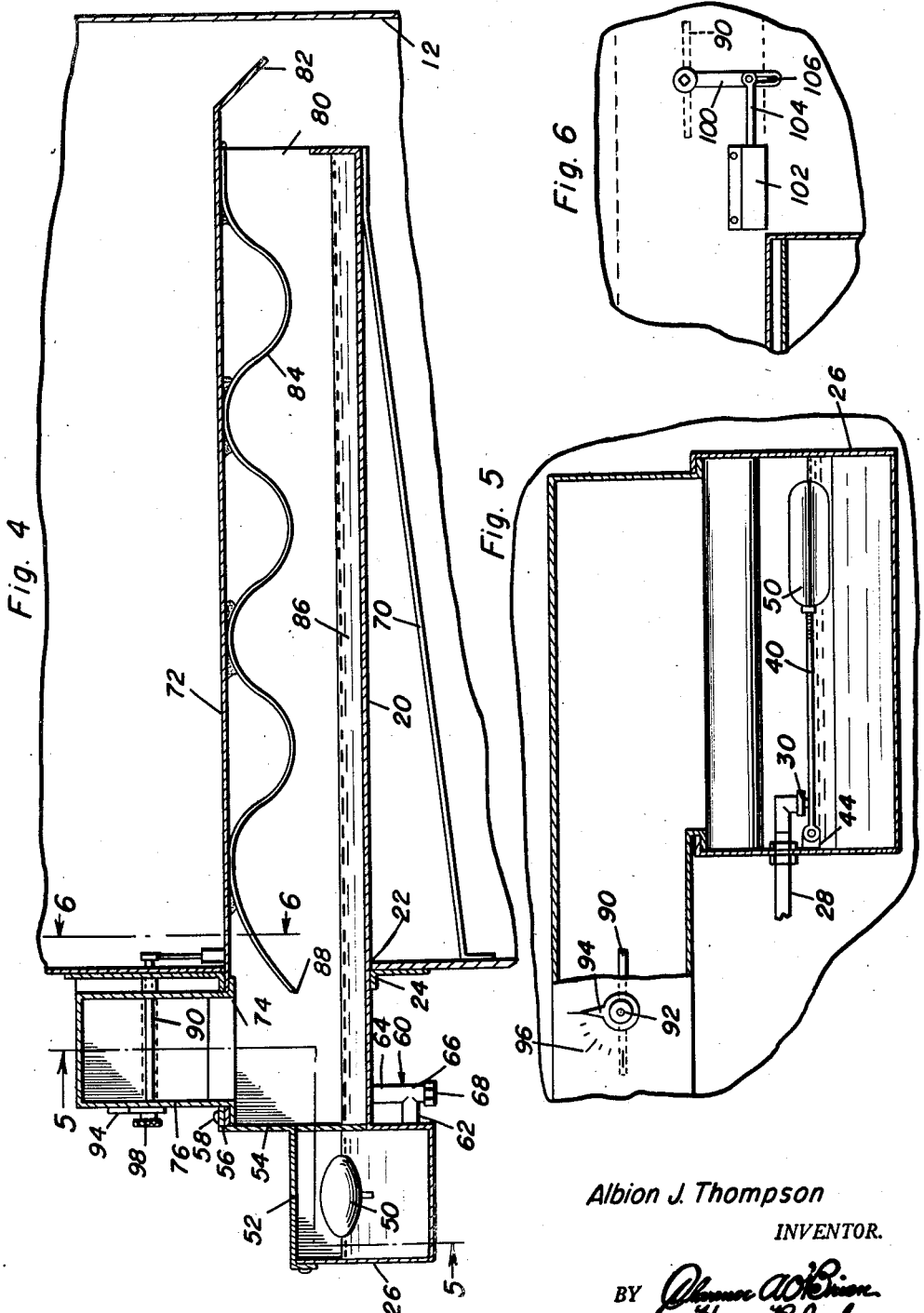
Albion J. Thompson
INVENTOR.

United States Patent Office 2,806,466
Patented Sept. 17, 1957

2,806,466

HUMIDIFYING SYSTEM

Albion J. Thompson, Washburn, Maine

Application April 16, 1954, Serial No. 423,626

2 Claims. (Cl. 126—113)

This invention relates to a humidifier and particularly to a humidifier for humidifying the air of a warm air circulating furnace.

In the heating of buildings or other enclosed spaces the utilization of so-called hot air furnaces or furnaces in which air is recirculated to maintain the space in the building or other structure at a suitable temperature has been at a decided disadvantage because the warm air is particularly dry and this dryness not only results in discomfort to persons or animals in the space but also dries out articles including portions of the building so that they my become loose or damaged. Many efforts have been made to properly humidify the warm air being circulated. Evaporating pans of various types have been utilized and various types of porous or semi-porous materials have been added in the pans to increase the evaporation and the decrease of the undesirable effects of dry dehumidified air. Further, as is well known the evaporation of water into the already heated air tends to reduce the temperature of the air so that the proper heating is frequently deleteriously effected.

The present invention provides a humidifier in which the degree of humidification may be readily determined and in which the humidified air is passed over the furnace so that it is properly heated and not cooled because of the humidifying action.

This is accomplished by means of an evaporating pan having a window into which the warm air may be drawn and having a conduit connecting the pan to the cold air return so that the difference in pressure between the cold air return and the hot air will cause heated air to flow through the space over the water in the evaporating pan and the heat of the air in the hot air space will heat the pan so that the air passing through will be moistened. The extent of the air being drawn over the evaporating pan is determined by means of a damper in the duct between the evaporating pan and the cold air return. Further, an undulating baffle or air guide is placed above the evaporating pan so that the warm air being drawn over the pan will be caused to impinge against the surface of the water to more readily absorb the water therefrom. The depth of the water in the pan is constantly controlled by means of an automatic valve chamber separate from the evaporating pan and if desired placed out of the effect of the heat applied to the pan. A suitable flood valve arrangement is utilized to control the flow of water into the valve controlled chamber and a suitable conduit herein shown as a T-shaped conduit supplies water from the valve chamber into the evaporating pan and communicates with the bottom thereof so that it will, to the maximum extent be free of scale or other formations.

It is accordingly an object of the invention to provide an improved humidifier.

It is a further object of the invention to provide a humidifier returning the humidified air to the air return so that it will be heated before circulation.

It is a further object of the invention to provide a humidifier in which the extent of humidification may be determined.

Other objects and many of the attendant advantages of the present invention will be apparent from the following detailed description taken in conjunction with the accompanying drawing in which:

Figure 1 is a top plan view of a furnace supplied with an evaporator according to the invention with parts of the furnace cover broken away;

Figure 2 is a front elevation of the furnace showing the application of the humidifier thereto;

Figure 3 is a view with parts broken away and in sections substantially on the plane indicated by the section line 3—3 of Figure 1 and showing the operation of the float valve;

Figure 4 is a longitudinal elevation through the evaporating pan and taken substantially on the plane indicated by the section line 4—4 of Figure 1;

Figure 5 is a cross sectional elevation taken substantially on the planes indicated by the section line 5—5 of Figure 4 and showing the relation of the valve controlled chamber and the connection of the air duct extending from the evaporator to the air return; and Figure 6 is a fragmentary view showing the ultilization of the humidistat to control the opening of the duct between the evaporating pan and the air return.

In the exemplary embodiment according to the invention a furnace 10 is provided with a warm air plenum 12 into which the heated air from about the furnace rises. As is well known the hot air will be distributed by various types of ducts from the warm air plenum to the various portions of the structure being heated. Likewise the furnace 10 is provided with a cold air return plenum 14 into which the returning or recirculating air is received and from which it is fed to the outer jacket of the furnace and preferably circulated by suitable means such as a blower fan although as is well understood gravity may be utilized for this purpose.

The humidifier proper comprises an evaporating pan 20 which is usually mounted within the warm air plenum 12 and extends through an aperture 22 in the side wall thereof and preferably is provided with reinforcing lips 24 to properly mount the humidifier on the relatively thin material of the warm air plenum. Water is controlled and supplied into the evaporating pan 20 by means of a valve control chamber 26 into which water is introduced by means of a suitable conduit 28. The flow of water from the conduit 28 into the chamber 26 is controlled by means of a valve 30 which cooperates with a valve terminal 32 on the conduit 28 and which is preferably secured to the walls of the chamber 26 by suitable means such as the lock nuts 34 and 36. The valve 30 will usually be provided with a resilient valve element 38. The valve portion 30 will be mounted on an arm 40 and a float operating device by means of a boss 42. The arm 40 will be journalled on a pair of ears 44 and secured on the wall of the chamber 26 by any suitable means such as welding 46 and a suitable pivot pin 48 will be provided to secure proper motion of the arm 40. A float member 50 will be mounted on the float arm 40.

Chamber 26 will be provided with a cover 52 which is provided with an upstanding portion 54 which terminates in an inturned lip 56 which will be secured to the top of the evaporating pan 20 by any suitable means such as the screws or rivets 58.

The valve chamber 26 will be connected into the bottom of the evaporating pan 28 by means of a T-shaped conduit 60. The stem portion 62 of the conduit 60 extends into the valve chamber 26 and one arm 64 of the T-shaped member communicates through the bottom of the evaporating pan 20 and terminates adjacent the bottom surface thereof. The other arm 66 of the T-shaped member 60 will be provided with a removable cap 68 so that any sediment or scale getting into the T-shaped member may be readily removed therefrom.

A suitable brace 70 is preferably provided between the side wall of the plenum and the inner end of the evaporating pan 20 to properly support the same in levelled relation therein.

A cover 72 is provided over the evaporating pan 20 and is provided adjacent the outer end thereof with an aperture 74 into which is joined an air duct 76 which extends from the warm air plenum 12 over to the cold air intake 14 and is communicated therewith by means of an aperture 78.

An aperture or window 80 is provided in the opposite end of the evaporating pan 20 so that the interior of the evaporating pan is communicated with the warm air in the warm air plenum 12. Preferably the cover 72 is provided with a downwardly extending lip 82 to guard the aperture 80 and prevent the ingress of undesired material therein so that the evaporating pan 20 will not be clogged by means of material carried thereinto. An undulating air guide or baffle 84 is provided on the undersurface of the cover 72 and extends in proximity with the surface of the water 86 in the evaporating pan 20. Preferably the undulating sinusoidal air guide 84 terminates in a downwardly extending terminal 88 substantially adjacent the aperture 74 so that the air will be directed into contact with substantially the entire surface 86 of the water in the evaporating pan 20.

A damper 90 is placed in the duct 76 and pivoted by a pin 92. Preferably the pin 92 extends outwardly from the front surface of the duct 76 and is provided with a pointer 94 cooperating with the scale 96 to show the position of the damper 90 within the duct. Also preferably a hand operating knob 98 is applied to the end of the shaft 92 so that the damper may be manually set to any desired position.

Preferably an automatic control is applied for the damper 90 and constitutes an operating lever 100 to which is connected an operating device 102 by means of a reciprocating pitman arm 104 which is connected to the lever 100 by means of the slide 106. The actuating device 104 will usually be controlled by means of a humidistat, not shown, so that the damper 90 will be positioned in response to the humidity produced by the device.

In the operation of the humidifier according to the invention, the pan 20 is extended within the warm air plenum to be heated by the warm air therein and the valve control chamber 26 will be filled with water by the action of the float control valve so that the water will flow through the T-shaped conduit into the bottom of the evaporating pan to the height of the water in the control chamber 26. In the event scale or lime formation should close the aperture in the conduit 60 the cap 68 may be readily removed and a chisel or other like device utilized to again open the passage therethrough. Because of the difference in pressure between the warm air and the air returned there will be a tendency for the air to flow through the evaporating pan and the duct 76. Consequently, when the damper 90 is opened the air from the warm air plenum will pass through the aperture 80 and will reverberate against the top surface of the water in the evaporating pan 20 because of the undulating surface of the guide or baffle mounted in the top of the device. The moist or humidified air will be introduced into the return air which will pass through the furnace to be completely heated so that the evaporation of the water in the evaporating pan will not reduce the temperature of the air being circulated. Obviously, if desired, the position of the damper 90 may be manually controlled or on the other hand it may be automatically controlled in response to the actuation of a humidistat at any position where the air circulates.

For purpose of exemplification a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. In combination with the warm air chamber and cold air return of a hot air furnace, an evaporator pan having inner and outer ends, said pan being mounted in the warm air chamber with its outer end extending out of said warm air chamber, a duct exterior of said furnace and transverse to said pan, one end of said duct having an inlet overlying said outer end in communication with said pan and the other end of said duct being communicatively connected to the cold air return of the furnace, a cover on said pan closing the top thereof except for said duct inlet, means connected to the outer end of the pan and operative to maintain a constant level of water in the pan to provide an air passage between said cover and the surface of the water leading from the inner end of the pan to said duct, said inner end of said pan having a warm air inlet aperture therein above the level of the water admitting warm air into said passage from the warm air chamber of the furnace.

2. The combination of claim 1, and an undulating sinusoidal warm air baffle on said cover and in said passage extending above said water level from said aperture to and terminating at said duct inlet.

References Cited in the file of this patent

UNITED STATES PATENTS

| | | |
|---|---|---|
| 283,025 | Rowan | Aug. 14, 1883 |
| 716,380 | Clawson | Dec. 23, 1902 |
| 1,515,490 | Jordan | Nov. 11, 1924 |
| 1,692,816 | Chamberlin | Nov. 27, 1928 |
| 2,133,599 | Turney | Oct. 18, 1938 |
| 2,187,778 | Gardner | Jan. 23, 1940 |
| 2,303,948 | Morris | Dec. 1, 1942 |
| 2,430,890 | Schneible | Nov. 18, 1947 |
| 2,503,002 | Shreve | Apr. 4, 1950 |